(12) United States Patent
Shinkai et al.

(10) Patent No.: US 8,493,335 B2
(45) Date of Patent: Jul. 23, 2013

(54) REPRODUCTION APPARATUS, REPRODUCTION METHOD AND PROGRAM

(75) Inventors: Mitsutoshi Shinkai, Kanagawa (JP); Junzo Tokunaka, Kanagawa (JP); Kotaro Kashiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1004 days.

(21) Appl. No.: 12/207,003

(22) Filed: Sep. 9, 2008

(65) Prior Publication Data

US 2009/0096755 A1  Apr. 16, 2009

(30) Foreign Application Priority Data

Oct. 10, 2007  (JP) .................................. 2007-264006

(51) Int. Cl.
*G06F 3/041* (2006.01)
*H04B 3/36* (2006.01)

(52) U.S. Cl.
USPC ....................................... 345/173; 340/407.1

(58) Field of Classification Search
USPC .......................................................... 345/173
See application file for complete search history.

(56) References Cited

U.S. PATENT DOCUMENTS

| | | | |
|---|---|---|---|
| 6,075,967 A * | 6/2000 | Naimark et al. | 434/307 R |
| 6,392,710 B1 * | 5/2002 | Gonsalves et al. | 348/578 |
| 6,690,387 B2 * | 2/2004 | Zimmerman et al. | 345/684 |
| 6,965,371 B1 * | 11/2005 | MacLean et al. | 345/156 |
| 7,480,864 B2 * | 1/2009 | Brook et al. | 715/720 |
| 7,949,232 B2 * | 5/2011 | Toyoda et al. | 386/343 |
| 7,952,638 B2 * | 5/2011 | Shinkai et al. | 348/333.01 |
| 2001/0035854 A1 * | 11/2001 | Rosenberg et al. | 345/156 |
| 2003/0076306 A1 * | 4/2003 | Zadesky et al. | 345/173 |
| 2003/0090504 A1 * | 5/2003 | Brook et al. | 345/716 |
| 2006/0022958 A1 * | 2/2006 | Shiga | 345/173 |
| 2007/0003214 A1 | 1/2007 | Toyoda et al. | |
| 2007/0077024 A1 * | 4/2007 | Toyoda et al. | 386/68 |
| 2007/0097073 A1 | 5/2007 | Takashima et al. | |
| 2009/0102807 A1 * | 4/2009 | Kashiwa et al. | 345/173 |
| 2011/0043476 A1 * | 2/2011 | Christensen et al. | 345/174 |
| 2011/0128132 A1 * | 6/2011 | Ullrich et al. | 340/407.1 |

FOREIGN PATENT DOCUMENTS

| | | |
|---|---|---|
| JP | 2006-301736 | 11/2006 |
| JP | 2007-122501 | 5/2007 |
| WO | WO2008/019701 A2 * | 2/2008 |

* cited by examiner

*Primary Examiner* — Alexander S Beck
*Assistant Examiner* — Mihir Rayan
(74) *Attorney, Agent, or Firm* — Oblon, Spivak, McClelland, Maier & Neustadt, L.L.P.

(57) ABSTRACT

Disclosed herein is a reproduction apparatus which includes a touch panel and vibrates the touch panel, including: a reproduction circuit configured to reproduce data in a unit of a frame in response to an operation of the touch panel by a user; and a driving circuit configured to vibrate the touch panel every time the data of each frame are reproduced.

6 Claims, 6 Drawing Sheets

REPRODUCTION APPARATUS, REPRODUCTION METHOD AND PROGRAM

CROSS REFERENCES TO RELATED APPLICATIONS

The present invention contains subject matter related to Japanese Patent Application JP 2007-264006 filed in the Japan Patent Office on Oct. 10, 2007, the entire contents of which being incorporated herein by reference.

BACKGROUND OF THE INVENTION

1. Field of the Invention

This invention relates to a reproduction apparatus, a reproduction method and a program, and more particularly to a reproduction apparatus, a reproduction method and a program wherein reproduction of data is controlled in response to an operation of a touch panel by a user.

2. Description of the Related Art

When an editor edits images, it uses an editing apparatus to reproduce, for example, images of an object of editing and search for an image at an editing point while it observes images reproduced successively.

Interfaces for controlling reproduction are provided on such an editing apparatus as described above, and one of such interfaces is a search bar displayed on a display apparatus on which a touch panel is provided as disclosed in Japanese Patent Laid-Open No. 2006-301736. In an editing apparatus in which the search bar is provided, reproduction is carried out at a reproduction speed and in a reproduction direction corresponding to the position of the search bar at which the user touches with the search bar using a finger of a hand thereof.

Meanwhile, a touch panel has been proposed which can exert acoustic vibration which can be sensed as sound by the user and tactile vibration which stimulates the tactile sensation of the user when the user touches with the touch panel using a finger of a hand thereof as disclosed, for example, in Japanese Patent Laid-Open No. 2007-122501. A linear or circular operation element is displayed on a display apparatus on which the touch panel is provided.

SUMMARY OF THE INVENTION

Incidentally, in image editing for business purpose, it is demanded to edit images in an accuracy of a unit of a frame. Accordingly, frame adjustment in the proximity of an editing point is significant. However, where images indicate a small amount of motion, even if reproduced images are observed, changeover between frames cannot be discriminated readily, and it is difficult to carry out frame adjustment in the proximity of an editing point.

Further, when an editing person carries out frame adjustment in the proximity of an editing point, the editing person determines, for example, a range of a time code for searching for the editing point and searches for the editing point in an accuracy of a unit of a frame while it observes images reproduced within the range. Accordingly, the user must search for the editing point while it confirms both of the reproduced image, for example, displayed on a display apparatus and the time code of the image. Therefore, where the display positions of the displayed image and the displayed time code of the image are spaced away from each other, it is necessary for the user to move its line of sight inconveniently.

Therefore, it is desirable to provide a reproduction apparatus, a reproduction method and a program wherein, where reproduction of data is controlled in response to an operation of a touch panel by a user, the user can search out desired data readily in an accuracy of a unit of a frame.

According to an embodiment of the present invention, there is provided a reproduction apparatus which includes a touch panel and vibrates the touch panel, including a reproduction circuit configured to reproduce data in a unit of a frame in response to an operation of the touch panel by a user, and a driving circuit configured to vibrate the touch panel every time the data of each frame are reproduced.

The reproduction apparatus may be configured such that, where the speed of the reproduction by the reproduction circuit is not higher than a substantially normal speed, the vibration circuit vibrates the touch panel every time the data of each frame are reproduced, but where the speed of the reproduction is higher than the substantially normal speed, the vibration circuit vibrates the touch panel at predetermined intervals of time.

In this instance, the reproduction apparatus may further include a determination circuit configured to determine a speed of the reproduction in response to an operation of the touch panel by the user, the reproduction circuit reproducing the data at the speed of the reproduction determined by the determination circuit.

Preferably, the reproduction apparatus further includes a display section configured to display an image based on the data reproduced by the reproduction circuit.

According to another embodiment of the present invention, there is provided a reproduction method for a reproduction apparatus which includes a touch panel and vibrates the touch panel, including the steps of reproducing data in a unit of a frame in response to an operation of the touch panel by a user, and vibrating the touch panel every time the data of each frame are reproduced.

According to a further embodiment of the present invention, there is provided a program for causing a computer to execute a process including the steps of reproducing data in a unit of a frame in response to an operation of a touch panel by a user, and vibrating the touch panel every time the data of each frame are reproduced.

In the reproduction apparatus, reproduction method and program, data are reproduced in a unit of a frame in response to an operation of the touch panel by a user, and the touch panel is vibrated every time data of each frame are reproduced.

With the reproduction apparatus, reproduction method and program, reproduction can be controlled. Further, where reproduction of data is controlled in response to an operation of the touch panel by a user, the user can search out desired data readily in an accuracy of a unit of a frame.

According to a still further embodiment of the present invention, there is provided a reproduction apparatus which includes a touch panel and vibrates the touch panel, including a reproduction circuit configured to reproduce data in a unit of a field in response to an operation of the touch panel by a user, and a driving circuit configured to vibrate the touch panel every time the data of each field are reproduced.

In the reproduction apparatus, data are reproduced in a unit of a field in response to an operation of the touch panel by a user, and the touch panel is vibrated every time data of each field are reproduced.

With the reproduction apparatus, reproduction can be controlled. Further, where reproduction of data is controlled in response to an operation of the touch panel by a user, the user can search out desired data readily in an accuracy of a unit of a field.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
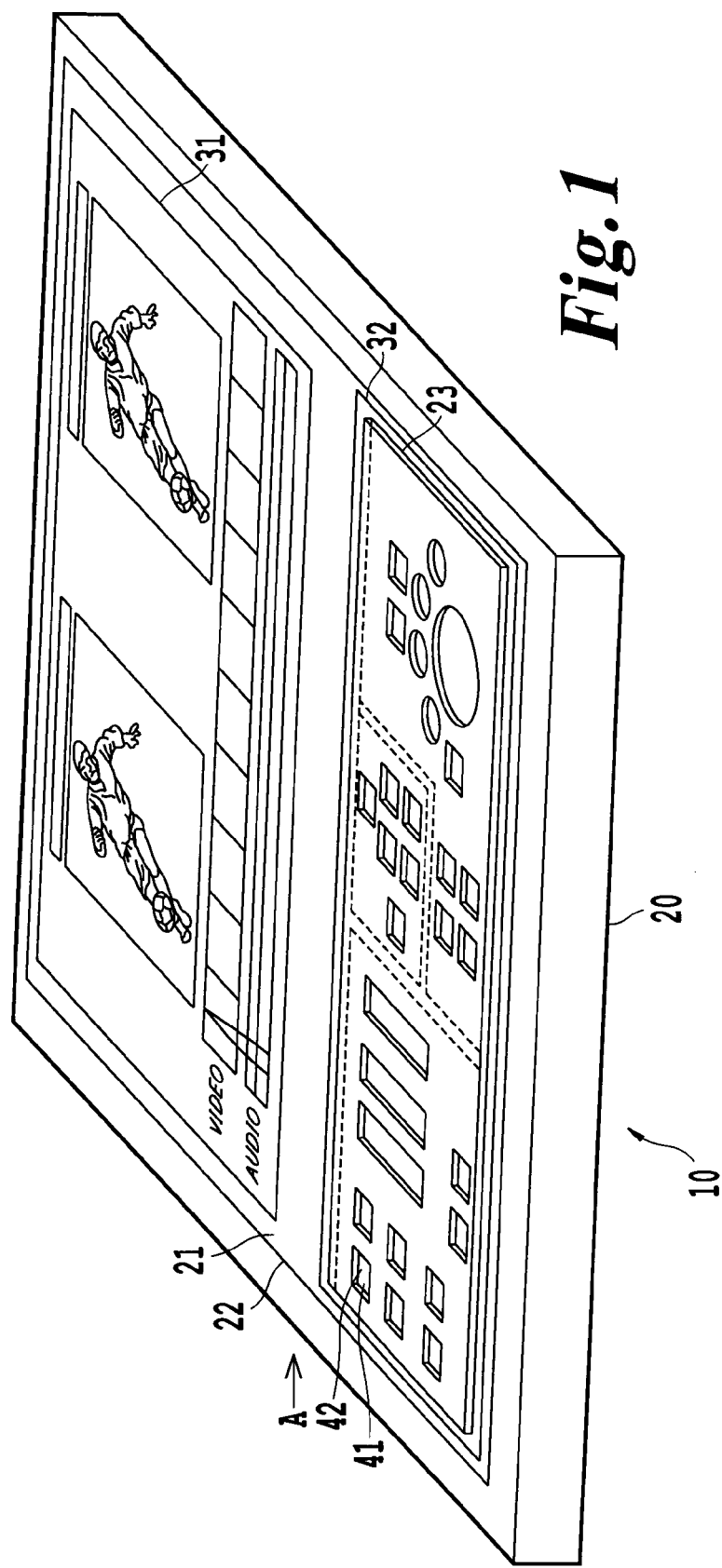
FIG. 1 is a perspective view showing an example of a configuration of an editing apparatus to which an embodiment of the present invention is applied.

Referring first to FIG. 1, there is shown an example of a configuration of an editing apparatus to which an embodiment of the present invention is applied.

A display apparatus 22 on which a touch panel 21 is laminated is provided at a central portion of an upper face of a housing 20 of an editing apparatus 10. An image region 31 in which an image of an object of editing or the like is to be displayed is provided on the farther side in FIG. 1 of the display apparatus 22. Meanwhile, an operation element region 32 in which operation elements 41 to which functions relating to editing are allocated are provided (displayed) on the nearer side in FIG. 1 of the display apparatus 22.

It is to be noted that details of display contents in the image region 31 and the operation element region 32 are hereinafter described with reference to FIGS. 5 and 2.

A cover panel 23 for assisting an operation of an operation element 41 by a user is mounted in a region of the touch panel 21 which corresponds to the operation element region 32. Holes 42 are provided in regions of the cover panel 23 which correspond to the operation elements 41 such that the size thereof gradually increases from the bottom face which contacts with the touch panel 21 to the upper face of the cover panel 23. Consequently, the user can recognize the position of any operation element 41 through a feel at a finger of a hand thereof using its hole 42 as a lead. As a result, the user can carry out touch-typing.

The cover panel 23 is formed from a transparent material such that the user can visually confirm characters and so forth displayed in the operation element region 32 through the cover panel 23 and the touch panel 21.

The user would carry out an operation for a desired one of the operation elements 41 displayed on the display apparatus 22 by touching with the touch panel 21 at a position corresponding to the operation element 41 using a finger of a hand thereof. The user would search for an editing point by carrying out an operation for the operation element 41 to cause, for example, material data which become a material of editing such as data of an image or sound to be reproduced in a unit of a frame to search for an editing point.

At this time, the editing apparatus 10 causes the surface of the touch panel 21 to vibrate in a pulsed manner within a reproduction time period (for example, 1/30 second) of one frame or causes the surface of the touch panel 21 to vibrate in a pulsed manner at predetermined intervals within a period of the interval every time material data of each frame are reproduced in response to a reproduction speed.

As a result, the user can recognize that reproduction is proceeding by sensing the vibration of the surface of the touch panel 21 through a finger of a hand thereof.

Where the surface of the touch panel 21 vibrates in a pulsed manner every time material data of one frame are reproduced, even if the motion between images is small, the user can recognize changeover between frames readily and accurately by sensing the vibration of the surface of the touch panel 21 through a finger of a hand thereof. As a result, the user can search out desired material data readily in an accuracy of a unit of a frame.

Since, with the editing apparatus 10, the user can sense it by means of a finger of a hand or the like thereof that reproduction is proceeding or changeover between frames has occurred as described above, the editing apparatus 10 is suitable particularly where the user carries out touch-typing.

Figure 2:
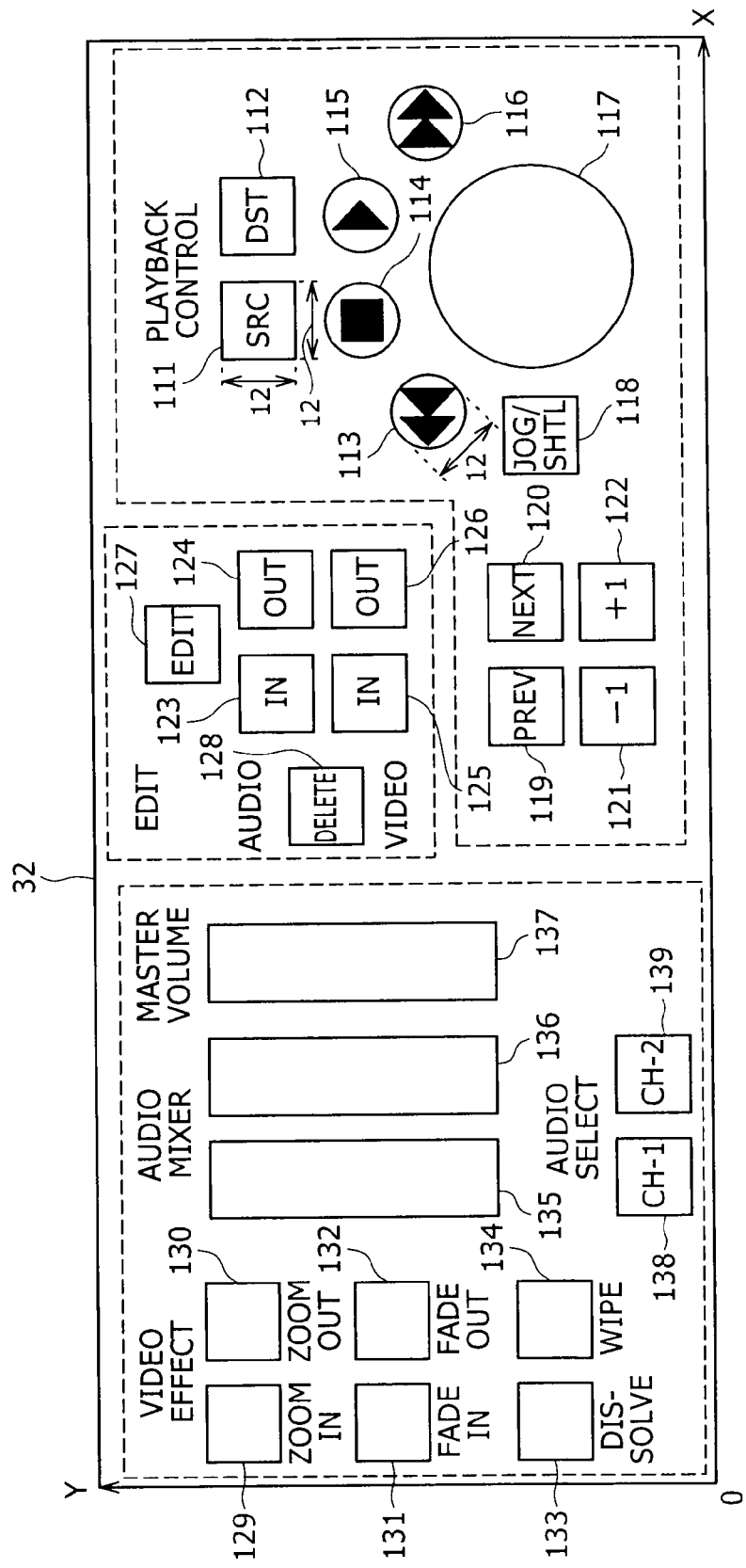
FIG. 2 is a schematic view showing an example of a screen image in an operation element region shown in FIG. 1.

FIG. 2 shows an example of a display image of the operation element region 32 shown in FIG. 1.

Referring to FIG. 2, an operation element 111 is displayed as a square having sides of 12 at a position in the operation element region 32 which corresponds to a square hole 42 formed in the cover panel 23 at a right upper portion of the operation element region 32.

It is to be noted that characters "SRC" representing an editing source (SOURCE) are displayed in the inside of the operation element 111, and the operation element 111 is operated in order to issue an instruction relating to reproduction of material data of an editing source. The user can issue various instructions relating to reproduction of material data by operating operation elements 113 to 122 hereinafter described after it operates the operation element 111.

Meanwhile, another operation element 112 is displayed at a position of the operation element region 32 which corresponds to a square hole 42 provided in the cover panel 23 on the right side of the operation element 111.

It is to be noted that characters "DST" representing an editing destination (DESTINATION) are displayed in the inside of the operation element 112, and the operation element 112 is operated in order to issue an instruction relating to reproduction of a result of editing which is a destination of editing. The user can issue various instructions relating to reproduction of a result of editing by operating the operation elements 113 to 122 hereinafter described. Further, characters "PLAYBACK CONTROL" representing an instruction for reproduction control which is a function of all of the operation elements 111 to 122.

Further, the operation element 113 is displayed in the form of a circle having a diameter of 12 at a position of the operation element region 32 which corresponds to a circular hole 42 provided in the cover panel 23 on the left lower side of the operation element 111. It is to be noted that a mark representative of rewinding (REWIND) is displayed in the inside of the operation element 113, and the operation element 113 is operated in order to issue an instruction to carry out rewinding reproduction of material data or a result of editing.

Also the other operation elements 114 to 139 are displayed at positions corresponding to holes 42 provided in the cover panel 23. In particular, the operation element 114 is displayed in the form of a circle, in the inside of which a mark representative of stopping (STOP) is displayed, at a position in the operation element region 32 which corresponds to a circular hole 42 provided in the cover panel 23 on the right upper side of the operation element 113. The operation element 114 is operated in order to issue an instruction to stop reproduction of material data or a result of editing.

The operation element 115 is displayed in the form of a circle, in the inside of which a mark representative of reproduction (PLAY) is displayed, at a position in the operation element region 32 which corresponds to a circular hole 42 provided in the cover panel 23 on the right side of the operation element 114. The operation element 115 is operated in order to issue an instruction to reproduce material data or a result of editing. The operation element 116 is displayed in the form of a circle, in the inside of which a mark representative of fast feeding is displayed, at a position in the operation element region 32 which corresponds to a circular hole 42 provided in the cover panel 23 on the right lower side of the operation element 115. The operation element 116 is operated in order to issue an instruction to carry out fast feeding reproduction of material data or a result of editing.

The operation element 117 is displayed in the form of a circle at a position in the operation element region 32 which corresponds to a circular hole 42 provided in the cover panel 23 on the lower side of the operation elements 114 and 115. The operation element 117 is slidably operated in a circumferential direction in order to issue an instruction to move the reproduction position of material data or a result of editing. For example, the user can issue an instruction to move the reproduction position rearwardly by slidably operating the inside of the operation element 117 in the clockwise direction along the circle. Further, the user can issue an instruction to move the reproduction forwardly by slidably operating the inside of the operation element 117 in the counterclockwise direction along the circumference.

The operation element 118 is displayed in the form of a square, on which characters "JOG/SHTL" which represent a jog mode and a shuttle mode are indicated, at a position in the operation element region 32 which corresponds to a square hole 42 provided in the cover panel 23 on the left side of the operation element 117. The operation element 118 is operated in order to issue an instruction to set the mode of the operation element 117 to the jog mode or the shuttle mode. It is to be noted that the jog mode is a mode in which the reproduction position is moved in response to movement of the operation position while the shuttle mode is a mode in which the reproduction speed is varied in response to movement of the operation position.

It is to be noted that, in the following description, the operation element 117 is referred to as jog dial 117 and the operation element 118 is referred to as mode button 118 in order to facilitate distinction from the other operation elements.

The operation element 119 is displayed in the form of a square, on which characters "PREV" which represent "PREVIOUS" are indicated, at a position in the operation element region 32 which corresponds to a square hole 42 provided in the cover panel 23 on the left side of the mode button 118. The operation element 119 is operated in order to issue an instruction to move the reproduction position to a top position of an immediately preceding clip hereinafter described. It is to be noted that the clip represents material data obtained by one time of image pickup processing, that is, image pickup processing from a start of image pickup to an end of the image pickup.

The operation element 120 is displayed in the form of a square, on which characters "NEXT" which represent the next is displayed, at a position in the operation element region 32 which corresponds to a square hole 42 provided in the cover panel 23 on the right side of the operation element 119 and on the left side of the mode button 118. The operation element 120 is operated in order to issue an instruction to move the reproduction position to a top position of an immediately succeeding clip.

The operation element 121 is displayed in the form of a square, on which "−1" which represents an immediately preceding frame is displayed, at a position in the operation element region 32 which corresponds to a square hole 42 provided in the cover panel 23 on the lower side of the operation element 119. The operation element 121 is operated in order to issue an instruction to move the reproduction position to an immediately preceding frame. The operation element 122 is displayed in the form of a square, on which "+1" which represents an immediately succeeding frame is displayed, at a position in the operation element region 32 which corresponds to a square hole 42 provided in the cover panel 23 on the lower side of the operation element 120. The operation element 122 is operated in order to issue an instruction to move the reproduction position to an immediately succeeding frame.

The operation element 123 is displayed in the form of a square, on which "IN" which represents an in-point as an editing point representative of a start position of editing is displayed, at a position in the operation element region 32 which corresponds to a square hole 42 provided in the cover panel 23 on the upper side of the operation element 119. The operation element 123 is operated in order to issue an instruction to designate the current reproduction position as an in-point of sound. It is to be noted that characters "AUDIO" representing the audio are displayed on the left side of the operation element 123.

The operation element 124 is displayed in the form of a square, on which "OUT" which represents an out-point is displayed, at a position in the operation element region 32 which corresponds to a square hole 42 provided in the cover panel 23 on the right side of the operation element 123. The operation element 124 is operated in order to issue an instruction to designate the current reproduction position as an out-point of sound.

The operation element 125 is displayed in the form of a square, on which "IN" which represents an in-point is displayed, at a position in the operation element region 32 which corresponds to a square hole 42 provided in the cover panel 23 on the upper side of the operation element 119 and on the lower side of the operation element 123. The operation element 125 is operated in order to issue an instruction to designate the current reproduction position as an in-point of an image. It is to be noted that characters "VIDEO" representing the image are displayed on the left side of the operation element 125.

The operation element 126 is displayed in the form of a square, on which "OUT" which represents an out-point is displayed, at a position in the operation element region 32 which corresponds to a square hole 42 provided in the cover panel 23 on the upper side of the operation element 120 and on the lower side of the operation element 124. The operation element 126 is operated in order to issue an instruction to designate the current reproduction position as an out-point of an image.

The operation element 127 is displayed in the form of a square, on which "EDIT" which represents editing is displayed, at a position in the operation element region 32 which corresponds to a square hole 42 provided in the cover panel 23 on the right upper side of the operation element 123 and on the left upper side of the operation element 124. The operation element 127 is operated in order to issue an instruction to insert a portion of the material data from the in-point to the out-point indicated by the operation elements 125 to 127 into the current reproduction position of a result of the editing. It is to be noted that characters "EDIT" representing an editing instruction which is a function of all of the operation elements 123 to 128 are displayed on the left side of the operation element 127.

The operation element 128 is displayed in the form of a square, on which characters "DELETE" which represent deletion or erasure are displayed, at a position in the operation element region 32 which corresponds to a square hole 42 provided in the cover panel 23 on the left lower side of the operation element 123 and on the left upper side of the operation element 125. The operation element 128 is operated in order to issue an instruction to erase data at an in-point and an out-point of a result of editing indicated by the operation elements 123 to 126.

The operation element 129 is displayed in the form of a square displayed at a position in the operation element region 32 which corresponds to a square hole 42 provided in the cover panel 23 at a left upper portion of the operation element region 32. The operation element 129 is operated in order to issue an instruction to add a zoom-in effect to an image of a result of editing displayed in the image region 31 (FIG. 1). It is to be noted that "ZOOM IN" representative of a zoom-in effect is displayed on the lower side of the operation element 129.

The operation element 130 is displayed in the form of a square displayed at a position in the operation element region 32 which corresponds to a square hole 42 provided in the cover panel 23 on the right side of the operation element 129. The operation element 130 is operated in order to issue an instruction to add a zoom-out effect to an image of a result of editing displayed in the image region 31. It is to be noted that "ZOOM OUT" representative of a zoom-out effect is displayed on the lower side of the operation element 130. It is to be noted that characters "VIDEO EFFECT" representing a video effect adding instruction which is a function of all of the operation elements 129 to 134 are displayed on the upper side of the operation elements 129 and 130.

The operation element 131 is displayed in the form of a square displayed at a position in the operation element region 32 which corresponds to a square hole 42 provided in the cover panel 23 on the lower side of the operation element 129. The operation element 131 is operated in order to issue an instruction to add a fade-in effect to an image of a result of editing displayed in the image region 31. It is to be noted that "FADE IN" representative of a fade-in effect is displayed on the lower side of the operation element 131.

The operation element 132 is displayed in the form of a square displayed at a position in the operation element region 32 which corresponds to a square hole 42 provided in the cover panel 23 on the lower side of the operation element 130. The operation element 132 is operated in order to issue an instruction to add a fade-out effect to an image of a result of editing displayed in the image region 31. It is to be noted that "FADE OUT" representative of a fade-out effect is displayed on the lower side of the operation element 132.

The operation element 133 is displayed in the form of a square displayed at a position in the operation element region 32 which corresponds to a square hole 42 provided in the cover panel 23 on the lower side of the operation element 131. The operation element 133 is operated in order to issue an instruction to add a dissolve effect to an image of a result of editing displayed in the image region 31. It is to be noted that "DISSOLVE" representative of a dissolve effect is displayed on the lower side of the operation element 133.

The operation element 134 is displayed in the form of a square displayed at a position in the operation element region 32 which corresponds to a square hole 42 provided in the cover panel 23 on the lower side of the operation element 132. The operation element 134 is operated in order to issue an instruction to add a wipe effect to an image of a result of editing displayed in the image region 31. It is to be noted that "WIPE" representative of a wipe effect is displayed on the lower side of the operation element 134.

The operation element 135 is displayed in the form of a rectangle at a position in the operation element region 32 which corresponds to a square hole 42 provided in the cover panel 23 on the right side of the operation elements 130 and 132. The operation element 135 is slidably operated in a longitudinal direction in order to issue an instruction to change the sound volume of sound of the channel 1. Meanwhile, the operation element 136 is displayed in the form of a rectangle at a position in the operation element region 32 which corresponds to a square hole 42 provided in the cover panel 23 on the right side of the operation element 135. The operation element 136 is slidably operated in a longitudinal direction in order to issue an instruction to change the sound volume of sound of the channel 2.

When the user wants to increase the sound volume of a desired channel, it would slidably operate the inside of the operation element 135 or 136 corresponding to the channel in the upward direction by an amount corresponding to the amount of change of the sound volume by means of a finger of a hand thereof or the like. On the other hand, when the user wants to decrease the sound volume of a desired channel, it would slidably operate the inside of the operation element 135 or 136 corresponding to the channel in the downward direction by an amount corresponding to the amount of change of the sound volume by means of a finger of a hand thereof or the like. It is to be noted that characters "AUDIO MIXER" representative of an instruction to adjust the sound volume which is a function of the operation elements 135 and 136 are displayed on the upper side of the operation elements 135 and 136.

The operation element 137 is displayed in the form of a rectangle displayed at a position in the operation element region 32 which corresponds to a rectangular hole 42 provided in the cover panel 23 on the right side of the operation element 136. The operation element 137 is slidably operated in a longitudinal direction thereof in order to issue an instruction to change the master volume. The user can operate the operation element 137 similarly to the operation element 135 or 136. It is to be noted that characters "MASTER VOLUME" representative of an instruction to change the master volume which is a function of the operation element 137 are displayed on the upper side of the operation element 137.

The operation element 138 is displayed in the form of a square, on which "CH-1" which represents the channel 1 is displayed, at a position in the inside of the operation element region 32 which corresponds to a square hole 42 provided in the cover panel 23 on the lower side of the operation element 135. The operation element 138 is operated in order to issue an instruction to select whether or not sound data of the channel 1 should be included in a result of editing.

The operation element 139 is displayed in the form of a square, on which "CH-2" which represents the channel 2 is displayed, at a position in the inside of the operation element region 32 which corresponds to a square hole 42 provided in the cover panel 23 on the lower side of the operation element 136. The operation element 139 is operated in order to issue an instruction to select whether or not sound data of the channel 2 should be included in a result of editing. Characters "AUDIO SELECT" representative of an instruction to select sound which is a function of all of the operation elements 138 and 139 are displayed on the upper side of the operation elements 138 and 139.

Since the operation elements 111 to 139 shown in FIG. 2 are displayed in corresponding shapes at positions corresponding to the holes 42 of the cover panel 23 mounted on the touch panel 21 as described above, the user can touch with a position corresponding to any of the displayed positions of the operation elements 111 to 139 of the touch panel 21 using a finger of a hand or the like to input various instructions relating to editing.

Further, since the cover panel 23 is formed from a transparent material as described hereinabove, the user can visually observe, through the cover panel 23, the characters representative of the functions of the operation elements 111 to 139 displayed at positions other than the positions corresponding to the holes 42 in the proximity of the operation elements 111 to 139. As a result, the user can recognize the functions of the operation elements 111 to 139 readily.

Figure 3:
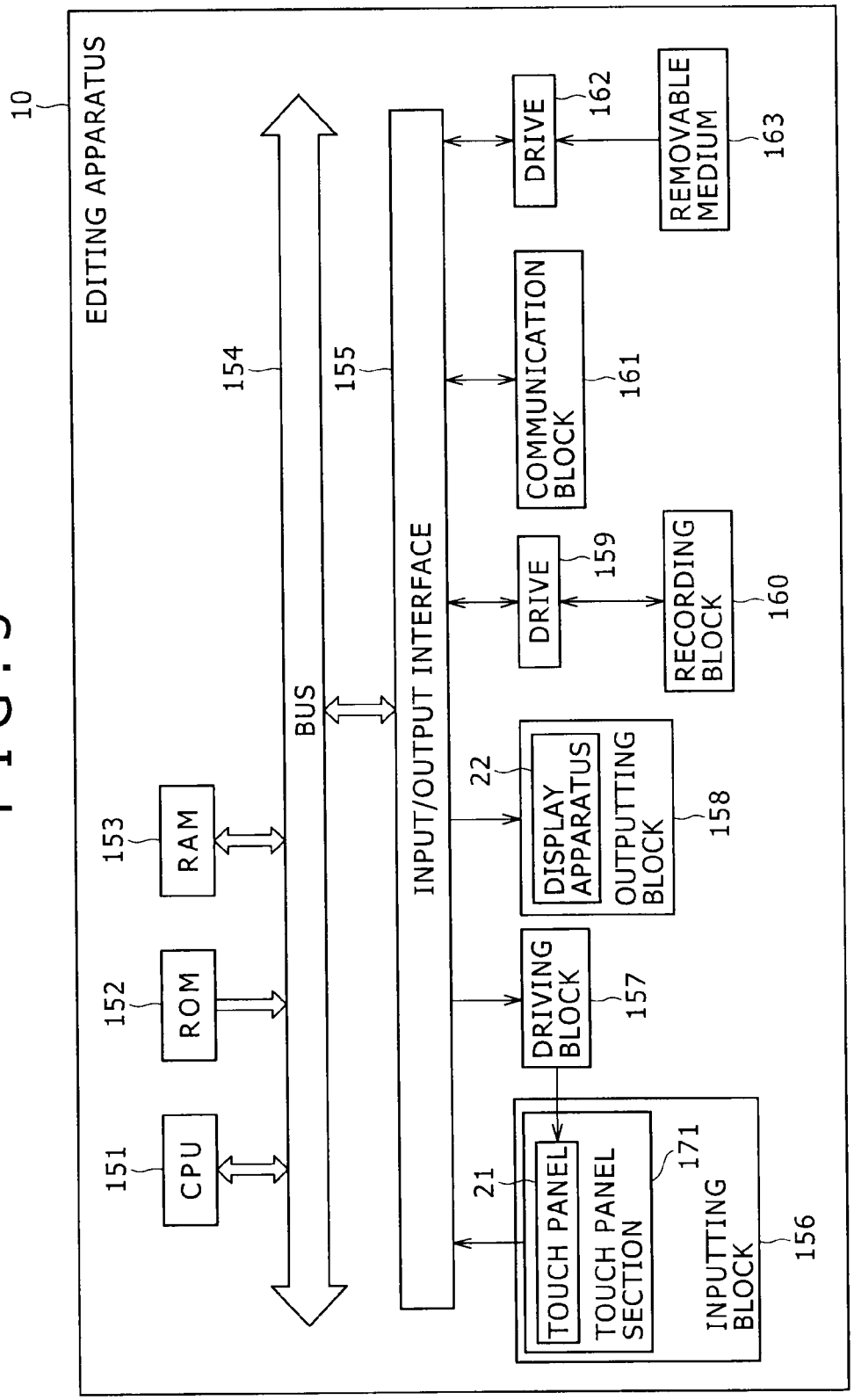
FIG. 3 is a block diagram showing an example of a configuration of the editing apparatus of FIG. 1.

FIG. 3 shows an example of a configuration of the editing apparatus 10 of FIG. 1.

Referring to FIG. 3, a CPU (Central Processing Unit) 151 executes various processes in accordance with a program stored in a ROM (Read Only Memory) 152 or a program recorded in a recording block 160 hereinafter described. Into a RAM (Random Access Memory) 153, programs to be executed by the CPU 151, data and so forth are suitably stored. The CPU 151, ROM 152 and RAM 153 are connected to each other by a bus 154. It is to be noted that the CPU 151, ROM 152 and RAM 153 may otherwise be formed from a microcomputer.

An input/output interface 155 is connected to the CPU 151 by the bus 154. To the input/output interface 155, an inputting block 156 including a touch panel section 171 which in turn includes the touch panel 21 shown in FIG. 1 and so froth, a driving block 157 for vibrating the surface of the touch panel 21 in a pulsed manner and an outputting block 158 including the display apparatus 22 and so forth are connected.

The touch panel section 171 detects a pressure applied to the touch panel 21 by a touch therewith of a finger of a hand of the user and inputs operation position information representative of the position at which the pressure is detected to the CPU 151. The CPU 151 executes various processes, for example, in response to an input from the inputting block 156 and outputs a result of processes to the outputting block 158.

For example, the CPU 151 carries out an editing process of non-linearly editing material data recorded in a unit of a frame in the recording block 160 in response to operation position information inputted thereto from the touch panel section 171.

In particular, the CPU 151 controls a drive 159 in response to operation position information inputted from the touch panel section 171 to reproduce material data in a unit of a frame recorded in the recording block 160 in a reproduction direction and at a reproduction speed corresponding to an operation of the jog dial 117 (FIG. 2). Then, the CPU 151 supplies image data from within the reproduced material data to the display apparatus 22 so that an image based on the image data is displayed on the display apparatus 22.

Further, the CPU 151 describes a position designated as an editing point by an operation of the operation element 123 or 125 or the operation element 124 or 126 in response to operation position information inputted from the touch panel section 171 into an edit list representative of information relating to a result of editing of material data. Then, the CPU 151 controls the drive 159 to record the edit list into the recording block 160.

Furthermore, the CPU 151 reproduces material data recorded in the recording block 160 in accordance with the edit list in response to operation position information inputted thereto from the touch panel section 171 so that an image of a result of editing is displayed on the display apparatus 22 of the outputting block 158.

Further, the CPU 151 generates a frame changeover signal representative of a changeover between frames every time the frame of material data reproduced from the recording block 160 changes over. The CPU 151 supplies, during reproduction of material data at a reproduction speed substantially not higher than a normal speed in response to an operation of the jog dial 117, a driving signal for vibrating the surface of the touch panel 21 in a pulsed manner within a reproduction time period of one frame to the driving block 157. Consequently, every time material data of each frame are reproduced, the surface of the touch panel 21 vibrates in a pulsed manner.

The drive 159 connected to the input/output interface 155 records material data in a unit of a clip and an edit list described in each editing process as a file into the recording block 160, which may be formed from a hard disk, under the control of the CPU 151. Further, the drive 159 records a program to be executed by the CPU 151 and so forth into the recording block 160. Furthermore, the drive 159 reproduces material data recorded in the recording block 160 in a unit of a frame and supplies the reproduced material data to the CPU 151 under the control of the CPU 151.

A communication block 161 communicates with an external apparatus through a network such as the Internet or a local area network. For example, the communication block 161 acquires material data from an external apparatus through the network and supplies the acquired material data to the CPU 151. The material data are recorded, for example, into the recording block 160 under the control of the CPU 151.

A drive 162 connected to the input/output interface 155 drives, when a removable medium 163 such as a magnetic disk, an optical disk, a magneto-optical disk or a semiconductor memory is loaded therein, the removable medium 163 to acquire a program, data or the like recorded in the removable medium 163. The acquired program or data are transferred to and recorded into the recording block 160 as occasion demands. It is to be noted that a program may otherwise be acquired through the communication block 161 and recorded into the recording block 160.

Figure 4:
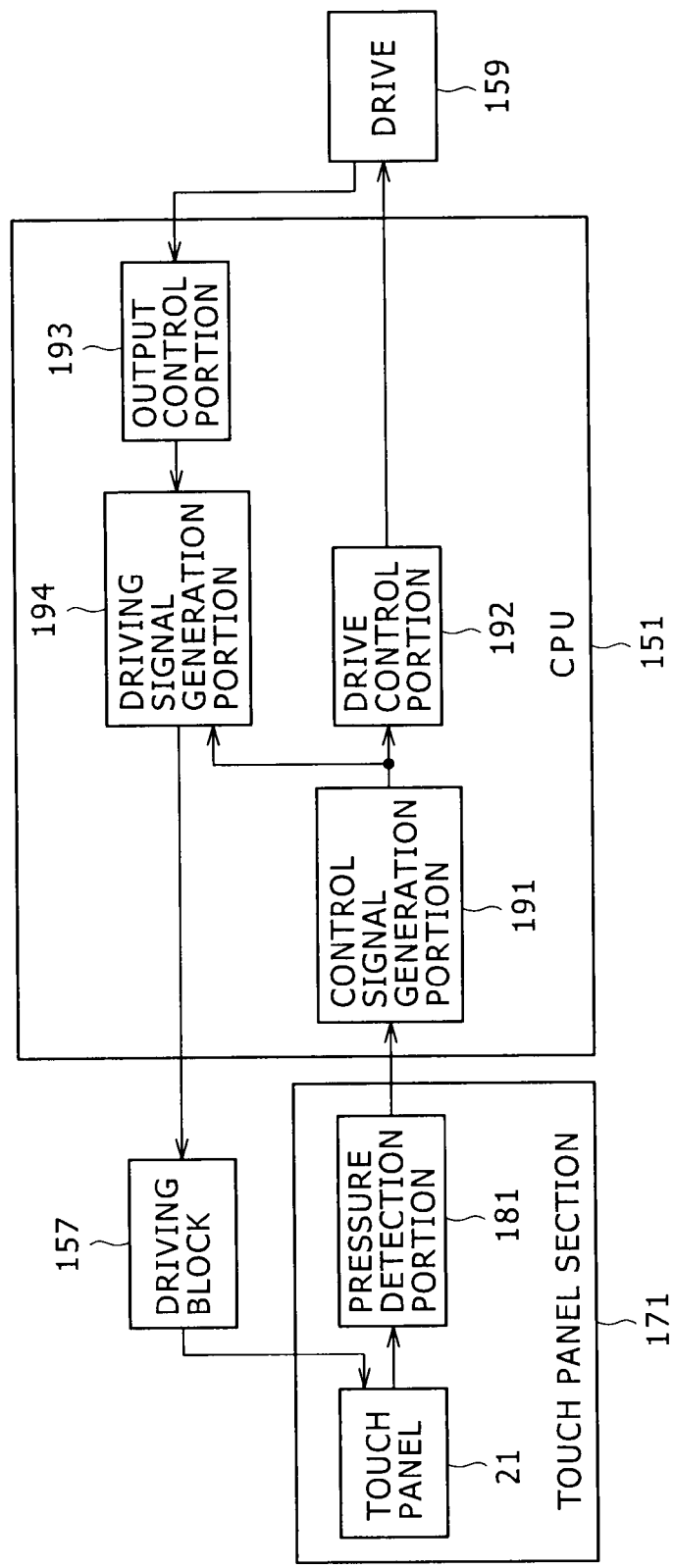
FIG. 4 is a block diagram showing an example of a functional configuration of the editing apparatus shown in FIG. 3.

FIG. 4 shows an example of a functional configuration of the editing apparatus 10 of FIG. 3.

Referring to FIG. 4, the touch panel section 171 is formed from the touch panel 21 and a pressure detection portion 181. The pressure detection portion 181 detects a pressure applied to the touch panel 21 by a touch therewith of a finger of a hand of the user and inputs operation position information to the CPU 151.

The CPU 151 includes a control signal generation portion 191, a drive control portion 192, an output control portion 193 and a driving signal generation portion 194.

The control signal generation portion 191 carries out, based on operation position information supplied thereto from the pressure detection portion 181 of the touch panel section 171, a process corresponding to an operation element 41 positioned at a position represented by the operation position information.

For example, the control signal generation portion 191 sets the mode of the jog dial 117 to the jog mode or the shuttle mode based on the operation position information representative of the position of the mode button 118 shown in FIG. 2.

Further, the control signal generation portion 191 determines, based on the operation position information representative of the position in the jog dial 117 and the mode of the jog dial 117, a reproduction direction and a reproduction speed corresponding to the position represented by the operation position information. Then, the control signal generation portion 191 generates a reproduction control signal which is a control signal for carrying out reproduction in the reproduction direction and at the reproduction speed, and supplies the reproduction control signal to the drive control portion 192. Further, the control signal generation portion 191 generates a vibration control signal which is a control signal representative of a type of vibration of the touch panel 21 and supplies the vibration control signal to the driving signal generation portion 194.

The drive control portion 192 controls the drive 159 based on a reproduction control signal supplied thereto from the control signal generation portion 191 to reproduce material data recorded in the recording block 160 in a unit of a frame in the reproduction direction and at the reproduction speed corresponding to the reproduction control signal. The material data in a unit of a frame reproduced from the recording block 160 by the drive 159 are supplied to the output control portion 193.

The output control portion 193 supplies image data from within the material data in a unit of a frame supplied thereto from the drive 159 to the display apparatus 22 so that an image corresponding to the image data is displayed on the display apparatus 22. Further, the output control portion 193 generates a frame changeover signal every time the frame of material data supplied thereto from the drive 159 changes over, and supplies the frame changeover signal to the driving signal generation portion 194.

The driving signal generation portion 194 controls the driving block 157 to vibrate the surface of the touch panel 21 in a pulsed manner based on a vibration control signal supplied thereto from the control signal generation portion 191 and a frame changeover signal supplied thereto from the output control portion 193.

Figure 5:
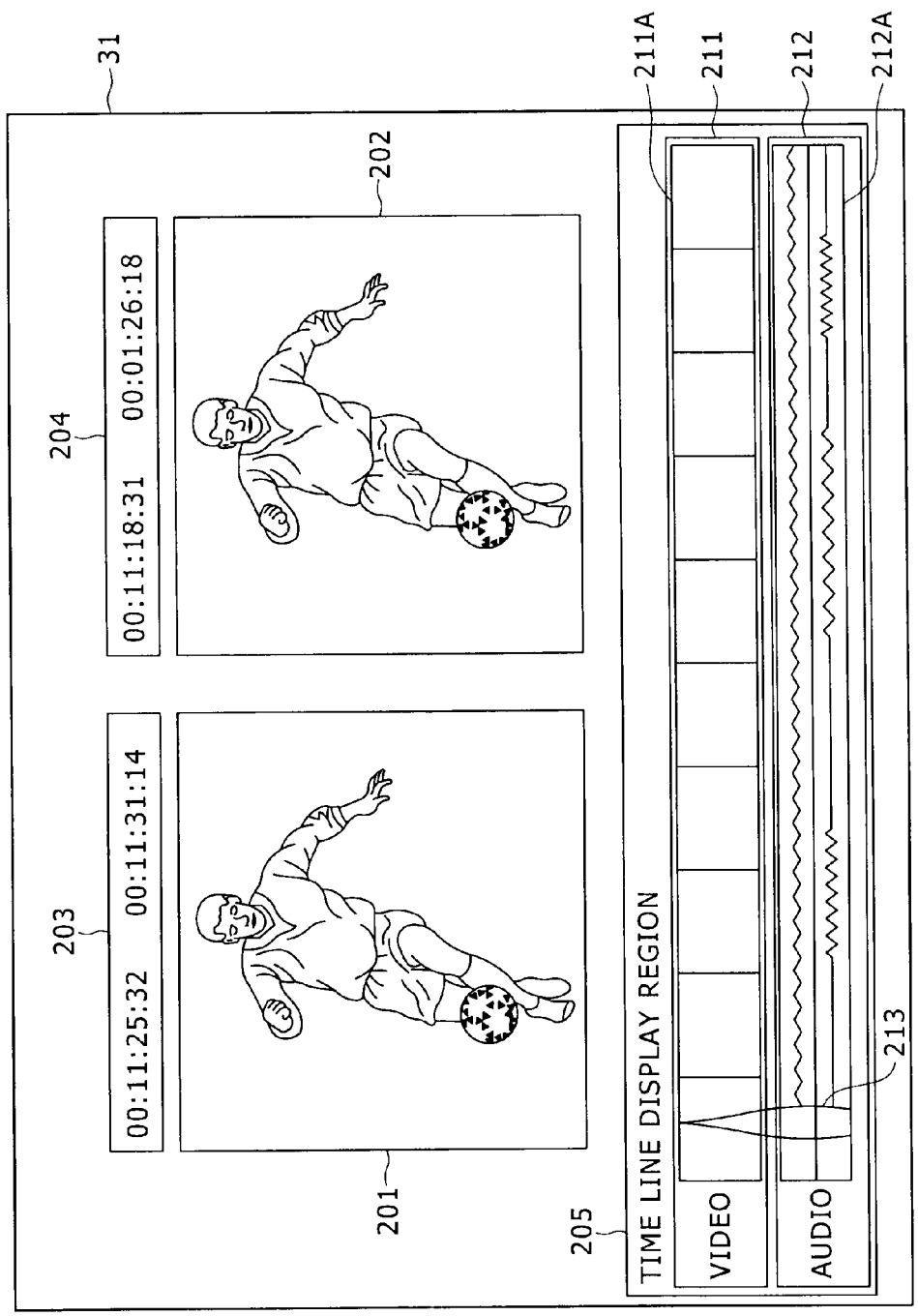
FIG. 5 is a schematic view showing an example of a screen image displayed in an image region shown in FIG. 1.

FIG. 5 shows an example of a screen image displayed on the image region 31 shown in FIG. 1.

Referring to FIG. 5, the image region 31 includes image display regions 201 and 202, time code display regions 203 and 204, and a time line display region 205.

In the image display region 201, an image corresponding to material data is displayed when a reproduction instruction of the material data is issued. In the image display region 202, an image corresponding to a result of editing is displayed when a reproduction instruction of the result of editing is issued.

In the time code display region 203, an FTC (File Time Code) of the image displayed in the image display region 201 is displayed at a left portion, and an FTC of a terminal end of a clip corresponding to the image is disposed at a right portion. It is to be noted that the FTC is relative position information allocated to each frame in order beginning with a top frame of each file with the number of the top frame set to "0."

Since an FTC of an image of material data during reproduction is displayed in the time code display region 203 of the editing apparatus 10 in such a manner as described above, when the user carries out frame adjustment in the proximity of an editing point, it can recognize a search range which is a range of the FTC for searching for an editing point.

Thus, the user would calculate the number of times of vibration in a pulsed manner corresponding to the recognized search range. As a result, where the surface of the touch panel 21 vibrates in a pulsed manner every time one frame is reproduced, the user can sense the vibration with a finger of a hand thereof or the like placed on the touch panel 21 to search for an editing point in the search range while observing an image displayed in the image display region 201 based on the calculated number of times of vibration in a pulsed manner.

For example, if the user recognizes the periods of time of 0.5 seconds (15 frames) across the FTC of an image currently displayed on the image display region 201 as a search range, the user would operate the jog dial 117 to carry out forward reproduction and backward reproduction and search for an editing point while the number of times of vibration in a pulsed manner of the touch panel 21 is within 15 during each reproduction while observing an image displayed in the image display region 201. By this, the user can search out an editing point in the search range readily.

In the time code display region 204, an FTC of an image displayed in the image display region 202 when a result of editing is determined as one file is displayed in the left portion. Meanwhile, an FTC at a terminal end when a result of editing corresponding to an image displayed in the image display region 202 is determined as one file is displayed in the right portion of the image display region 202.

In the time line display region 205, an image line region 211 for displaying information of a time series of image data from among a result of editing corresponding to an image displayed in the image display region 202, a sound line region 212 for displaying information of a time series of sound data from within the result of editing, and a pointer 213 are displayed.

In the image line region 211, characters "Video" representative of an image are displayed at a left portion, and an image line 211A is disposed at a right portion. The image line 211A has a quadrangular shape whose axis of abscissa indicates a range from the top to the tail of FTCs where a result of editing is determined as one file, and is partitioned at positions corresponding to FTCs at the top positions of a result of editing in a unit of a clip.

It is to be noted that, in the quadrangles formed by partitioning the image line 211A at positions corresponding to the top positions of a result of editing in a unit of a clip, thumbnail images corresponding to the image data in the result of editing in a unit of a clip may be displayed.

In the sound line region 212, characters "Audio" representative of sound are displayed at a left portion, and a sound line 212A is displayed at a right portion. The sound line 212A has a quadrangular shape whose axis of abscissa indicates a range from the top to the tail of FTCs where a result of editing is determined as one file, and is divided in a vertical direction into a number of portions corresponding to a number of channels of sound data which can be outputted as a result of editing. In the example of FIG. 5, the number of channels of sound data which can be outputted as a result of editing is two, and the sound line 212A is divided into two portions in the vertical direction. In the two divisional portions of the quadrangle, levels of signals of sound of corresponding channels are displayed.

The pointer 213 represents the position of an image displayed on the image display region 202 in a result of editing. The pointer 213 is disposed at a position corresponding to an FTC of an image displayed in the image display region 202 in the image line region 211 and the sound line region 212.

Now, a vibration process by the CPU 151 of vibrating the surface of the touch panel 21 in a pulsed manner is described with reference to FIG. 6. This vibration process is started, for example, when operation position information is inputted from the pressure detection portion 181.

Figure 6:
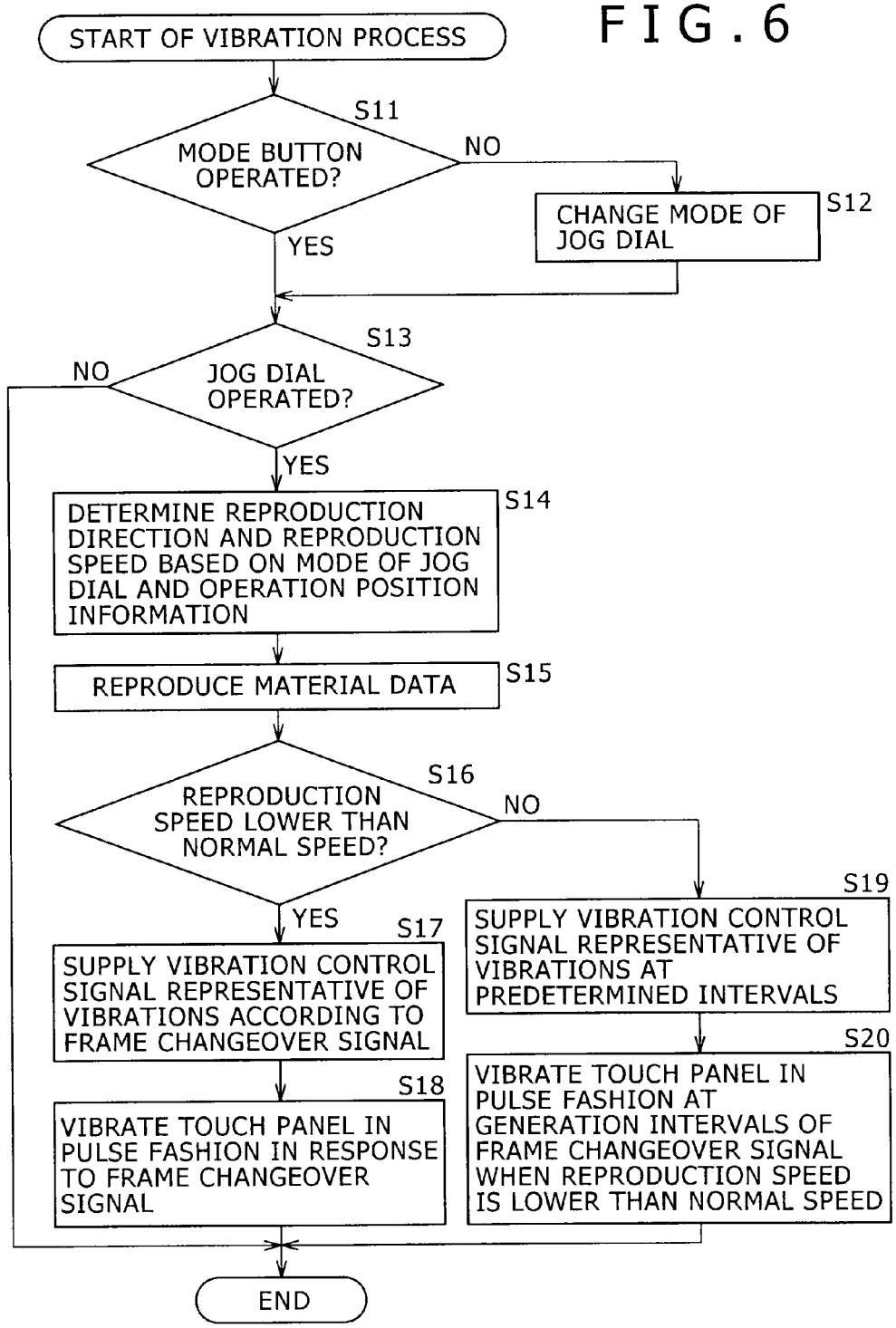
FIG. 6 is a flow chart illustrating a vibration process carried out by a CPU of the editing apparatus of FIG. 1.

Referring to FIG. 6, first at step S11, the control signal generation portion 191 decides based on the operation position information supplied thereto from the pressure detection portion 181 whether or not an operation for the mode button 118 is carried out by the user. If it is decided at step S11 that an operation for the mode button 118 is carried out, then the control signal generation portion 191 changes over the mode of the jog dial 117 from one to the other of the jog mode and the shuttle mode at step S12. Thereafter, the processing advances to step S13.

On the other hand, if it is decided at step S11 that an operation for the mode button 118 is not carried out, then the processing advances to step S13.

At step S13, the control signal generation portion 191 decides based on the operation position information supplied thereto from the pressure detection portion 181 whether or not an operation for the jog dial 117 is carried out by the user. If it is decided at step S13 that an operation for the jog dial 117 is not carried out, then the processing is ended.

On the other hand, if it is decided at step S13 that an operation for the jog dial 117 is carried out, then the control signal generation portion 191 decides a reproduction direction and a reproduction speed based on the mode of the jog dial 117 and the operation position information at step S14. Then, the control signal generation portion 191 generates a reproduction control signal for carrying out reproduction in the reproduction direction and at the reproduction speed and supplies the generated reproduction control signal to the drive control portion 192.

At step S15, the drive control portion 192 controls the drive 159 based on the reproduction control signal supplied thereto from the control signal generation portion 191 to reproduce material data recorded in the recording block 160 in a unit of a frame in the reproduction direction and at the reproduction speed corresponding to the reproduction control signal.

At step S16, the control signal generation portion 191 decides whether or not the reproduction speed determined at step S14 is not higher than a substantially normal speed. If it is decided at step S16 that the reproduction speed is not higher than the substantially normal speed, then the control signal generation portion 191 supplies, at step S17, a vibration control signal representative of vibration in response to a frame changeover signal as a type of vibration to the driving signal generation portion 194.

At step S18, the driving signal generation portion 194 controls the driving block 157 in response to a frame changeover signal supplied thereto from the output control portion 193 to vibrate the surface of the touch panel 21 in a pulsed manner, thereby ending the processing.

On the other hand, if it is not decided at step S16 that the reproduction speed is not higher than the substantially normal speed, that is, if the reproduction is higher than the substantially normal speed, then the control signal generation portion 191 supplies, at step S19, a vibration control signal representative of predetermined intermittent vibration as a type of vibration to the driving signal generation portion 194.

At step S20, the driving signal generation portion 194 controls the driving block 157 to vibrate the surface of the touch panel 21 in a pulsed manner at generation intervals of the frame changeover signal when the reproduction speed is the substantially normal speed, thereby ending the processing.

It is to be noted that, while, in the foregoing description, material data are recorded in a unit of a frame, the material data may otherwise be recorded in a unit of a field. In this instance, the output control portion 193 generates a field changeover signal representative of changeover of a field every time the field of material data reproduced from the recording block 160 changes over, and supplies the generated field changeover signal to the driving signal generation portion 194. As a result, during reproduction at a reproduction speed not higher than the normal speed, every time material data of each field are reproduced, the surface of the touch panel 21 is vibrated in a pulsed manner within a reproduction time period (for example, 1/60 second) of one field.

Meanwhile, the driving block 157 may vibrate the surface of the entire touch panel 21 or may vibrate only a region of the surface of the touch panel 21 which corresponds to a region in which the jog dial 117 is displayed.

Further, the present invention can be applied not only to an editing apparatus for carrying out nonlinear editing apparatus but also other reproduction apparatus which reproduce data in a unit of a frame or in a unit of a field.

It is to be noted that, in the present specification, the steps which describe the program recorded in a program recording medium may be but need not necessarily be processed in a time series in the order as described, and include processes which are executed in parallel or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. A video editing apparatus which includes a touch panel and vibrates said touch panel, the video editing apparatus comprising:
   a reproduction circuit configured to reproduce recorded data on a frame by frame basis in response to an operation of said touch panel by a user;
   a vibration control signal generating unit configured to generate a vibration control signal based on a frame change signal which is generated each time that the data of each frame are reproduced; and
   a driving circuit configured to vibrate said touch panel based on the vibration control signal, wherein
   when a speed of the reproduction by the reproduction circuit is not higher than a substantially normal speed of the recorded data, the driving circuit vibrates the touch panel every time the data of each frame are reproduced, and
   when the speed of the reproduction by the reproduction circuit is higher than the substantially normal speed of the recorded data, the driving circuit vibrates the touch panel at predetermined intervals of time, the predetermined intervals of time being different times from the time the data of each frame are reproduced.

2. The video editing apparatus according to claim 1, further comprising
   a determination circuit configured to determine the speed of the reproduction in response to an operation of said touch panel by the user;
   said reproduction circuit reproducing the recorded data at the speed of the reproduction determined by said determination circuit.

3. The video editing apparatus according to claim 1, further comprising:
   a display section configured to display an image based on the recorded data reproduced by said reproduction circuit.

4. A video editing method for a video editing apparatus which includes a touch panel and vibrates said touch panel, the video editing method comprising the steps of:
   reproducing recorded data on a frame by frame basis in response to an operation of the touch panel by a user;

generating a vibration control signal based on a frame change signal which is generated each time that the data of each frame are reproduced; and vibrating the touch panel based on the vibration control signal, the vibrating step including vibrating the touch panel every time the data of each frame are reproduced when a speed of the reproduction in the reproducing step is not higher than a substantially normal speed of the recorded data, and vibrating the touch panel at predetermined intervals of time when the speed of the reproduction in the reproducing step is higher than the substantially normal speed of the recorded data, the predetermined intervals of time being different times from the time the data of each frame are reproduced.

5. A non-transitory computer-readable storage medium including computer executable instructions, wherein the instructions, when executed by a computer, cause the computer to perform a method for video editing, the method comprising the steps of:

reproducing recorded data on a frame by frame basis in response to an operation of a touch panel by a user;

generating a vibration control signal based on a frame change signal which is generated each time that the data of each frame are reproduced; and vibrating the touch panel based on the vibration control signal, the vibrating step including vibrating the touch panel every time the data of each frame are reproduced when a speed of the reproduction in the reproducing step is not higher than a substantially normal speed of the recorded data, and vibrating the touch panel at predetermined intervals of time when the speed of the reproduction in the reproducing step is higher than the substantially normal speed of the recorded data, the predetermined intervals of time being different times from the time the data of each frame are reproduced.

6. A video editing apparatus which includes a touch panel and vibrates said touch panel, the video editing apparatus comprising:

a reproduction circuit configured to reproduce recorded data on a field by field basis in response to an operation of said touch panel by a user;

a vibration control signal generating unit configured to generate a vibration control signal based on a field change signal which is generated each time that the data of each field are reproduced; and a driving circuit configured to vibrate said touch panel based on the vibration control signal, wherein when a speed of the reproduction by the reproduction circuit is not higher than a substantially normal speed of the recorded data, the driving circuit vibrates the touch panel every time the data of each field are reproduced, and when the speed of the reproduction by the reproduction circuit is higher than the substantially normal speed of the recorded data, the driving circuit vibrates the touch panel at predetermined intervals of time, the predetermined intervals of time being different times from the time the data of each frame are reproduced.

* * * * *